United States Patent
Westphal

(10) Patent No.: US 7,245,639 B2
(45) Date of Patent: Jul. 17, 2007

(54) COMPRESSION SCHEME FOR IP MOBILE USER

(75) Inventor: Cedric Westphal, San Francisco, CA (US)

(73) Assignee: Nokia Corporation, Espoo (FI)

( * ) Notice: Subject to any disclaimer, the term of this patent is extended or adjusted under 35 U.S.C. 154(b) by 1058 days.

(21) Appl. No.: 10/186,242

(22) Filed: Jun. 28, 2002

(65) Prior Publication Data

US 2003/0165162 A1  Sep. 4, 2003

Related U.S. Application Data

(60) Provisional application No. 60/360,773, filed on Mar. 1, 2002.

(51) Int. Cl.
*H04J 3/00* (2006.01)

(52) U.S. Cl. ...................................... 370/521; 370/477

(58) Field of Classification Search ...................... None
See application file for complete search history.

(56) References Cited

U.S. PATENT DOCUMENTS

| | | | |
|---|---|---|---|
| 5,774,467 A * | 6/1998 | Herrera Van Der Nood et al. ........................... | 370/428 |
| 6,438,123 B1 * | 8/2002 | Chapman .................... | 370/351 |
| 6,885,319 B2 * | 4/2005 | Geiger et al. ................. | 341/51 |
| 7,006,472 B1 * | 2/2006 | Immonen et al. ........... | 370/332 |
| 7,024,460 B2 * | 4/2006 | Koopmas et al. ........... | 709/206 |
| 2003/0058873 A1 * | 3/2003 | Geiger et al. ................ | 370/401 |
| 2003/0090397 A1 * | 5/2003 | Rasmussen ................... | 341/51 |

OTHER PUBLICATIONS

M. Degermark et al., "IP Header Compression", *Internet Engineering Task Force Network Working Group*, pp. 1-44, Feb. 1999.
C. Bormann et al., "Robust Header Compression (ROHC): Framework and four profiles: RTP, UDP, ESP, and uncompressed", *Internet Engineering Task Force Network Working Group*, pp. 1-157 Jul. 2001.

* cited by examiner

*Primary Examiner*—Phirin Sam
(74) *Attorney, Agent, or Firm*—Squire, Sanders & Dempsey L.L.P.

(57) ABSTRACT

Due to bandwidth constraints on the wireless link in an IP network, it is useful to compress the headers so as to maximize the utilization of the link. There exists Header Compression algorithms that make use of the similarity in consecutive headers in a packet flow to compress these headers. In this document, a novel header compression scheme was introduced that makes use of the similarity in consecutive flows from or to a given mobile terminal to compress these headers. Using information theory, the optimal gain to be expected from the use of such a scheme was analyzed. A model was defined for the distribution of the connections of a single user over the address space. The compression scheme was evaluated with respect to this model and to actual internet data traces. The scheme is complementary and the benefits are additional to the traditional approach to header compression. However, the scheme outperforms current schemes with respect to actual internet traces.

21 Claims, 11 Drawing Sheets

Fig. 1. A possible distribution of the calls in the time/frequency domain

Fig. 2. Entropy (bits) vs. minimum number of correspondents

Fig. 3. Frequency distribution

Fig. 4. Log-log diagram for the frequency distribution

Fig. 5. Block diagram for compression/decompression algorithm

Fig. 6. Achieved compression for $N_{mfab} = 20$

Fig. 7. Log diagram for the Achieved Compression with $N_{mfab} = 20$

Fig. 8. Achieved compression for $N_{lcab}=10$

Fig. 9. Log diagram for the Achieved Compression with $N_{lcab} = 10$

COMPRESSION SCHEME FOR IP MOBILE USER

RELATED APPLICATION

This utility patent application is a continuation of a previously filed U.S. provisional patent application, U.S. Ser. No. 60/360,773 filed on Mar. 1, 2002, the benefit of the filing date of which is hereby claimed under 35 U.S.C. §119(e).

FIELD OF THE INVENTION

The present invention relates to compression, and more particularly to compression relating to IP mobile users.

BACKGROUND OF THE INVENTION

Header Compression (HC) designs the coding of the Headers so as to reduce the overhead of the packets, and thus diminish the bandwidth use of a wireless link. The purpose of the HC algorithm is to improve on the ratio of the signaling vs. the payload for a packet.

As address space, or any other part of the header increases, the importance of compressing the header size also increases. Also, the bandwidth bottleneck in the future internet is the wireless link. It is predicted that in the year 2002, the number of hand-held computers is going to overtake the number of the traditional PCs. Thus, as optical networks makes bandwidth cheap on the wired link, the untethered channels are becoming more and more crowded. What is needed is a way to compress the header size to work over wireless links.

SUMMARY OF THE INVENTION

The present invention is directed at addressing the above-mentioned shortcomings, disadvantages and problems, and will be understood by reading and studying the following specification.

Generally, the present invention is directed at providing a compression scheme that makes use of the similarity in consecutive flows from or to a given mobile terminal to compress these headers. Information theory is used to analyze the optimal gain to be expected from the use of such a scheme. A model is defined for the distribution of the connections of a single user over the address space. The compression scheme is evaluated with respect to this model and to actual internet data traces. The compression scheme is complementary and the benefits are additional to the traditional approach to header compression. However, the scheme outperforms current schemes with respect to actual internet traces.

Due to bandwidth constraints on the wireless link in an IP network, the headers are compressed so as to maximize the utilization of the link.

DETAILED DESCRIPTION OF THE PREFERRED EMBODIMENT

Figure 1:
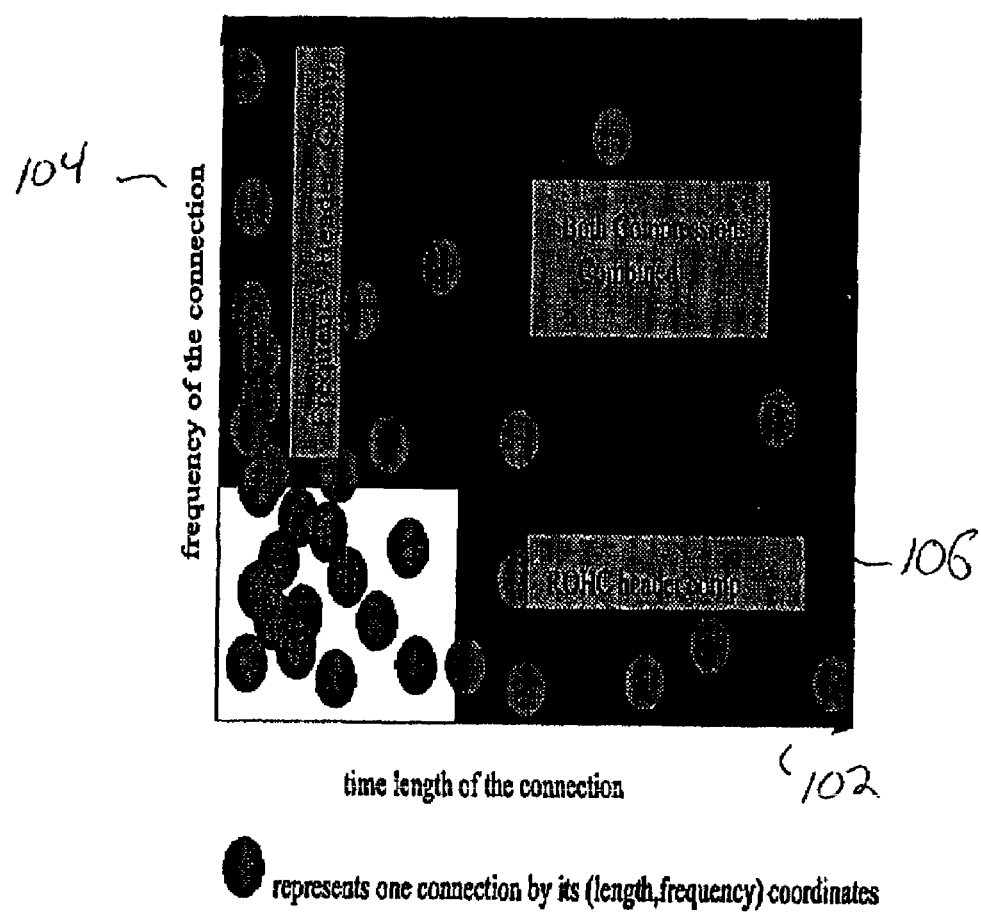
FIG. 1 illustrates a possible distribution of the calls in the time/frequency domain.

In the following detailed description of exemplary embodiments of the invention, reference is made to the accompanied drawings, which form a part hereof, and which is shown by way of illustration, specific exemplary embodiments of which the invention may be practiced. Referring to the drawings, like numbers indicate like parts throughout the views. Additionally, a reference to the singular includes a reference to the plural unless otherwise stated or is inconsistent with the disclosure herein.

I. Introduction

The present invention is directed at an improved Header Compression algorithm. An analysis of the optimal coding for a Header Compression algorithm is also presented. Entropy of the signal is computed, and thus derived is the optimal bit rate. Header Compression schemes are also described, and the header compression algorithm is compared to the theoretical optimal bound as well as the other already existing schemes.

II. Header Compression Review

First some terminology is introduced to help describe what is meant by Header Compression. We consider a link l. Denote a set of users U and by $p_u^i$, i=1, 2, . . . , u∈U the sequence of packets sent by user u, across the link l. To simplify the descriptions only sent packets are considered, however it could be received, the treatment is symmetric.

A packet $p_u^i$ is composed of an IP header and some data. The IP header is composed of several fields, such as source address (u's address), destination address, ports, protocol, and some transport protocol information.

The filter $f$ of a packet is defined here as the IP 5-tuple (source IP address, source port, destination IP address, destination port, protocol). The filter function F is defined such that: $F(p_u^i)$ gives the filter of the packet. Note that the definition of filter could be extended to cover other fields of the IP header.

Internet traffic is composed of microflows. Microflows are the elementary building blocks of Internet traffic. Assume a given time threshold τ.

A microflow $m_f$ is a sequence of packets with the same IP 5-tuple such that two consecutive packets are within τ units of time of each other.

Equivalently, if F(p) denotes the time stamp of packet p:

$$m_f = \{p_u^i : F(p_u^i)\} \quad \text{(EQUATION 1)}$$
$$= f \text{ and } |T(p_u^{i+1}) - T(p_u^i)| < \tau\}$$

By its definition, IP headers in a microflow exhibit some similarities: the filter is the same from one packet to the next. Furthermore, the protocol header is highly correlated as well. Similarities in the data attached to each packets in a microflow is not considered.

When a microflow crosses a bandwidth constrained link, the link layer can take advantage of this correlation to reduce the actual resource usage by compressing the IP header.

An IP Header Compression algorithm is a device to reduce bandwidth usage on a given link by replacing the IP header by a label (or compressed header) at one end of the link, transmitting the data with the label attached, then replacing the label at the other end of the link by the original (reconstructed) IP header.

Header Compression can be described as two functions, a compressor C applying on $(p^1, \ldots, p^J)$ and and a decompressor D applying on $(C(p^1), \ldots, C(p^J))$ such that, for the packets $p^J$ crossing link l;

$$\text{size}(C(p^J)) \leq \text{size }(p^J) \quad \text{(EQUATION 2)}$$

$$D(C\ p^j|p^1, \ldots, p^{J-1})|C(p^1), \ldots, C(p^{J-1})) = p^J \quad \text{(EQUATION 3)}$$

This model 2 does not account for the perturbation introduce by the link l. For purposes of this discussion, an ideal scenario is considered where the link transmits packets perfectly. Link perturbation introduces synchronization issues between C and D that are beyond the scope of this document. $C(f)$ denotes the compressed filter.

Several IP Header Compression (IP HC) schemes may provide this link functionality, mostly on bandwidth constrained wireless links. The most common schemes, the Van Jacobson (VJ) algorithm and the Robust Header Compression (ROHC) algorithm work on the same principles. These schemes make use of this predictable behavior of the header sequence within one microflow. Without entering into the technical details, the header that is sent is either a Full Header (FH), a First-Order Header (FO), or a second order header (SO).

A Full Header corresponds to the regular transmission of all the information bits that make the IPv6 header. It is the state with no compression.

First-Order Header corresponds to the header without the constant information (the IP 5-tuple, the constant fields in the protocol header . . . ). Changing fields (sequence number, time stamps . . . ) are represented entirely. This mode is used when both compressor and decompressor have acquired the necessary state.

Second Order Header. This state corresponds to the transmission of the sequence number, after the decompressor has acquired the information necessary to extract the other fields using the sequence number alone. Again, both compressor and decompressor need to acquire first the information before switching to this last mode.

III. Flow Frequency Model

Some Header Compression schemes can be described as a compression over time. The knowledge required to improve the compression factor is acquired over the time length of a microflow, and the compression state is learned after a transient period. The compressor waits for the decompressor to signal it has acquired the next state before the compressor can send the more compressed packets.

However, most microflows today are short lived, with small packets. These connections do not give enough time to the traditional header compression engine to acquire the compression state. Also, these packets, being small, have a very poor ratio of header over payload, especially when using IPv6.

Many recent studies have noted that the majority of TCP flows traveling over the wide area Internet are very short, with mean sizes around 10 KB and median sizes less than 10 KB. This implies a concentration of the traffic to the left of FIG. 1, unfortunately away from the application domain of the ROHC.

The frequency of a microflow for a given user is defined as the number of microflows from this user having the same IP 5-tuple divided by the total number of microflows from this user.

Denote by M(u) the set of all microflows to or from the user u. This frequency is also the probability that a flow in M(u) has filter $f$. Then $$\text{Frequency}(m_f) = p_f(u) = \frac{\sum_{m \in M(u)} 1_{\{(F(m)=f\}}}{|M(u)|} \quad \text{(EQUATION 4)}$$

In FIG. 1, we present a possible illustration of the microflows of a user in a time/frequency domain. The x-axis (102) represents the length of a connection. Connection and microflow have the same meaning herein. Longer UDP streams would be on the right-hand side of the graph. The y-axis (104) represents how frequent a connection is with respect to the other connection. For example, a mobile IP binding update, corresponding to a single packet flow from the Mobile Node to its Home Agent, would be a very short connection, but quite frequent, thus close to the y-axis. The frequency header compression scheme (108) is close to the y-axis. The ROHC compression scheme (106) applies to longer connection, so that the compression engine can acquire compression states. This is represented by the shaded area 106 on the right side of FIG. 1.

IV. Entropy of the Filter Space

Each of the IP headers of the packets of the microflows in M have the same size, but the microflows' filters have different frequency $p_f$. For the destination address, this constant size is 32 bits in IPv4, or 128 bits in IPv6. By assigning shorter size addresses to the most frequently used filters by u we can reduce the average size of the IP header. Different compression sizes reduce the average compressed length to different values. However, the optimal average compressed length is given by the entropy of the distribution $p_f$. The entropy H is given by the equation:

$$H = \sum_{f, m_f \in M} -p_f \log_2(p_f) \quad \text{(EQUATION 5)}$$

The distribution of the filters $p_f$ is approximated by Zipf's law, as is known from cache analysis. In order to compute the maximum possible gain, Zipf's law as an analytical model is used, and simulation data on some actual Internet trace is used.

A. Empirical Gain

The Internet trace we consider is the trace LBL-CONN7. This trace covers one full month of traffic in September 1993 between the Lawrence Berkeley Laboratory (LBL) and the rest of the world.

In this trace, 1645 nodes communicate from the LBL to the outside. These nodes communicate with a set of nodes outside the LBL. There are 35661 pairs (node LBL, node outside) in this trace. Each one of these pairs establishes one or more connections during the period of the study.

For any LBL node all of the nodes were extracted that it has established connection with, and the frequency distribution of such connections was extracted. The entropy of this distribution was then computed.

Figure 2:
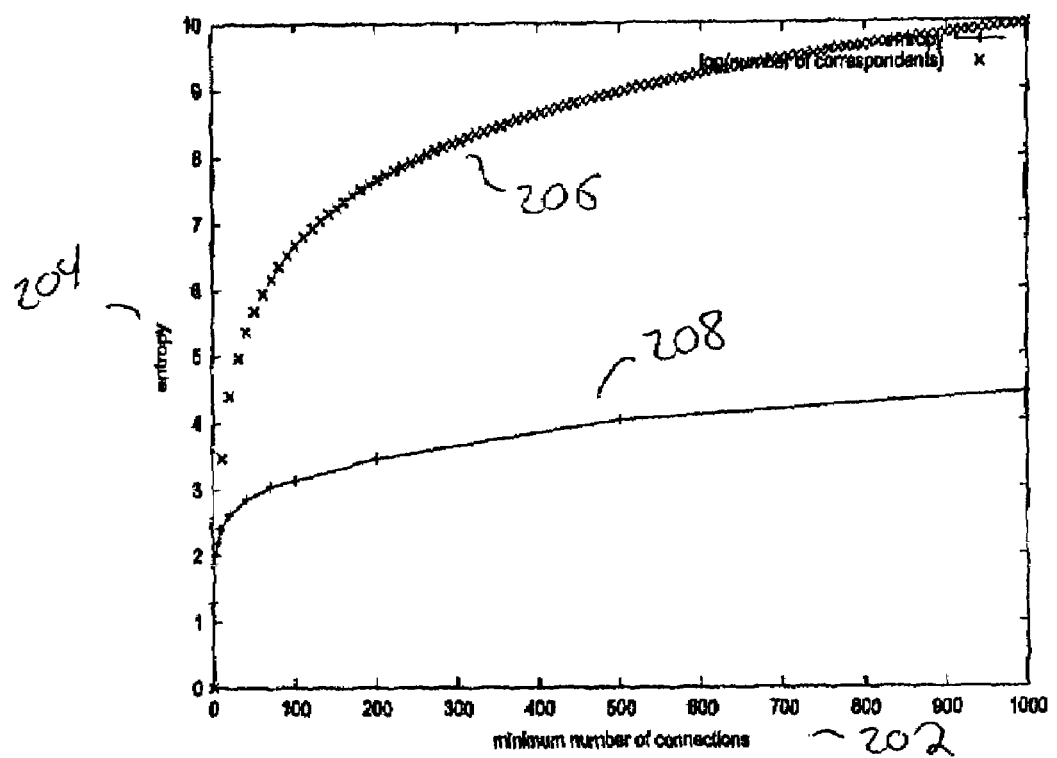
FIG. 2 shows an exemplary graph of entropy (bits) vs. minimum number of correspondents.

FIG. 2, shows the average entropy for these nodes in the LBL with respect to the minimum number of different corresponding in the outside world. The x-axis (202) represents the number of different addresses called out by one node in the LBL. The y-axis (204) represents the average entropy value of all nodes satisfying the minimum number of correspondents condition. For instance, the left-most point on the curve is the average entropy for all the nodes that attempted a connection during the measurement of the trace.

To make a comparison, the value $\log_2$ (number of correspondent) is also plotted (206) in FIG. 2. This is the entropy of one node calling uniformly a set of correspondent. The point of this comparison is to illustrate the possible gain due to compression. The uniform distribution corresponds to a fixed size addressing. Also, the $\log_2(n)$ curve corresponds to the entropy of a node corresponding to exactly n correspondents while the entropy curve (208) corresponds to the measured entropy of a node in the LBL corresponding to at least n correspondents. The entropy of course increases with the number n of correspondents.

As can be seen there is a significant possible improvement. For the 75 nodes in LBL connecting to at least 1000 different correspondents outside, the average address length could be reduced to less than 4.5 bits. Recall that the address is 32 bits or 128 depending on IPv4 or IPv6 being used. Recall also that we restricted ourselves to destination address. However, the protocol and port numbers may also be included, so as to compress the whole IP header. The gain should be even more significant, since some protocol (like TCP) or some ports (like port 80) are more heavily used than others, thus decreasing the overall entropy.

B. Analytical Gain

B.1 Zipf's Law

The distribution considered is the probability that a call to an address corresponds to the $i^{th}$ most frequent filter for a single user u.

$\tilde{p}_i(u) = p_f(u)$ s.t. $f$ is the $i^{th}$ most frequent filter in M (EQUATION 6)

$\tilde{p}_i(u)$ is the distribution $p_f(u)$ order by decreasing frequency. Assuming that all calls are independent from one another.

Figure 3:
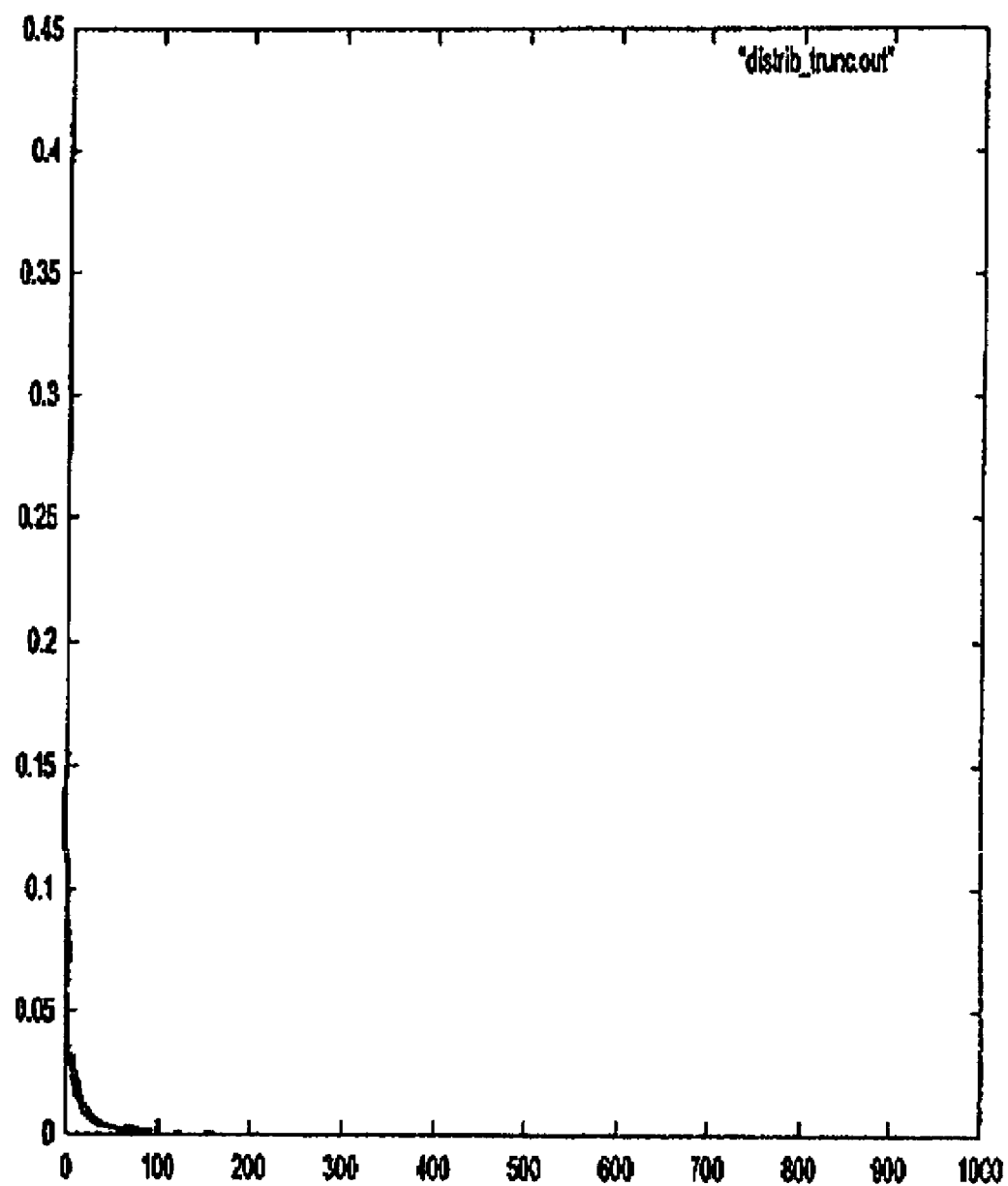
FIG. 3 illustrates an exemplary frequency distribution graph.

This probability distribution $\tilde{p}$ based on the LBL-CONN-7 trace is plotted. FIG. 3 illustrates the frequency distribution. The decay of the distribution seems to be of order $$o\left(\frac{1}{n}\right).$$

Figure 4:
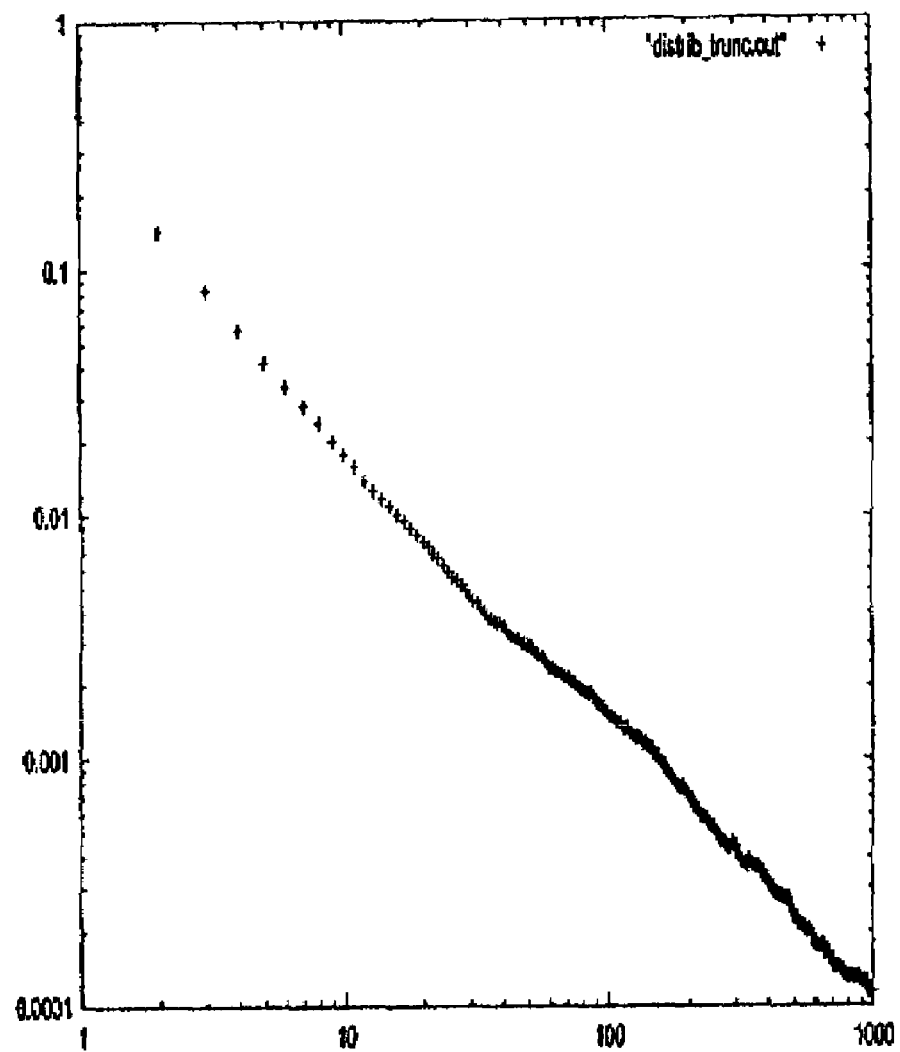
FIG. 4 shows an exemplary log—log diagram for the frequency distribution.

This is corroborated by FIG. 4. In this FIG. 4, the same quantity in a log-log diagram was plotted. The result is an almost straight line with slope close to −1.

This is in accordance with Zipf's distribution, where $$\tilde{p}_i = \frac{\Omega}{i},$$

with $\Omega$ a normalizing constant. Zipf's law is used to describe the reference probability of a document in a server. This reference probability is obtained by considering a group of user, possibly growing to an infinite size, accessing a set of documents. The individual behavior we underlined here seems to have the same asymptotic properties, namely a decay of the tail of the frequency probability of order $$o\left(\frac{1}{n}\right).$$

B.2 Entropy of Zipf's Distribution

To put some perspective into the results on the figure, the entropy of a Zipf distribution is computed.

Due to the fact the Zipf's law satisfies on an alphabet of N words:

$$p_{\overline{i}}^{z}(N) = \frac{\Omega}{i} \quad \text{for } i = 1, \ldots, N, \text{ with} \qquad \text{(EQUATION 7)}$$

$$\Omega = \left(\sum_{k=1}^{N} \frac{1}{k}\right)^{-1}$$

the entropy can be computed $$H^z(N) = -\sum_{i=1}^{N} p_i^z \log_2(p_i^z) \qquad \text{(EQUATION 8)}$$

$$= \sum_{i=1}^{N} \frac{\Omega}{i}(\log_2(i) - \log_2(\Omega))$$

Taking into account the fact that $\Omega \sim (\log(N))^{-1}$, it can be derived that, taking the limit as $N \to \infty$:

$$H^z(N) \sim \frac{\log_2(n)}{2} \qquad \text{(EQUATION 9)}$$

The entropy of the Zipf distribution converges to $$\frac{\log_2(n)}{2}$$

as N goes to $\infty$. Thus, the average code length is half that of the used alphabet, namely $\log_2(N)$. On our graph 2, it is actually slightly less than this, due to the fact that the most frequents values are a bit over-represented with respect to Zipf's distribution.

Note that in any case, the set of filters N will be a restricted subset of the address space. Thus, for a filter on the destination address, the size of the code would be $\log_2(N)/2$ bits for $N<<2^{128}$.

This very simple information theory analysis nonetheless yields a very important results: Header compression based on the frequency of the filters provides a possibly significant gain. The next section proposes an algorithm to achieve this gain.

V. Compression Algorithm

A. Description

An exemplary compressor and the decompressor are defined in this section.

A.1 Filter Table

Denote the time by t, and M(t) the set of all microflows originating from u until time t. Assume that all the quantities depend on the variables t so it is not explicitly shown in every instance.

A filter table is a table of elements of the form: (filter, filter count, time of first filter occurrence, filter rate, compressed filter). The compressed filter is also called the code word for the filter $f$. More precisely, each element is of the form:

$$(f, f\ count, f\ time, f\ rate, c) = \qquad \text{(EQUATION 10)}$$

$$\left(f, \sum_{p\ p\in m, m\in M} 1_{\{F(p)=f\}} \min_{m\in M}(T(p): p\in m\ \text{and}\ F(p) = f), \frac{f\ count}{t - f\ time}, C(f)\right).$$

A filter table has a finite depth D which is the number of entries in the table. Since the table contains both $f$ and $C(f)$, maintaining such a table provides a header compression function $c=C(f)$, as well as the decompression function $f=D(c)$. c is the code for $f$, and is a function of $f$ freq and t.

According to one embodiment of the invention, rates are used in the table instead of frequencies as it simplifies the comparisons for the algorithm. It is equivalent since the interest lies in the relative behavior of one filter with respect to the others.

To define the compression algorithm, and assuming that both C and F have the same filter tables available to them, it suffices to describe how this filter table evolves as a function of time.

Define a filter table $T_{freq}$ with depth $D_{Freq}$ and a filter table $T_{rec}$, with depth $D_{rec}$. A filter table keeps track of the microflow information corresponding to a given filter. Intuitively, $T_{freq}$ is assigned the task of keeping the information for the most frequent microflows, and $T_{rec}$ for the most recent microflows. $T_{rec}$, is ordered in a First-In-First-Out way: the entry on top of the table is the oldest one whereas the on at the bottom is the latest one.

$T_{rec}$ and $T_{freq}$ assign a mapping from $f$ to c, however, they use different alphabets: an entry in $T_{rec}$, cannot have the same c has an entry in $T_{freq}$.

A.2 Frequency Based Algorithm

Figure 5:
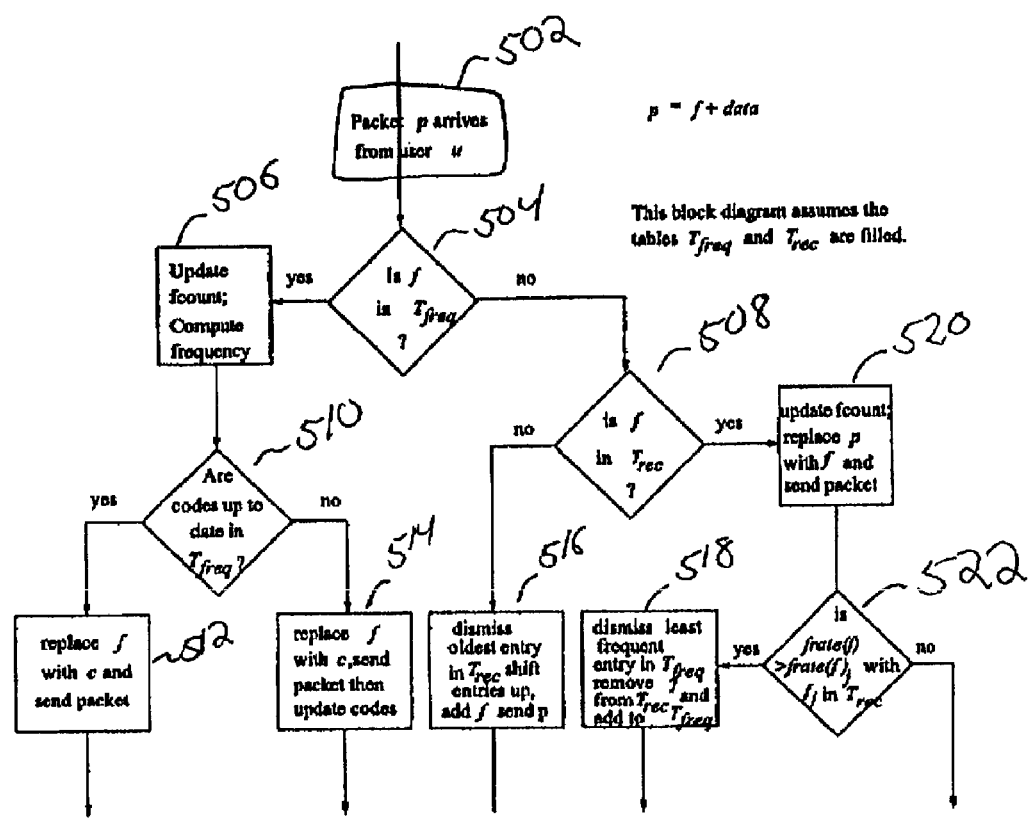
FIG. 5 illustrates a block diagram for compression/decompression algorithm.

FIG. 5 illustrates the flow to update the tables, according to aspects of the invention.

The compressor maintains two tables $T_{freq}$ and $T_{rec}$. The compressor receives a full packet p with filter $f$ from user a at time $t_p$ (502). Moving to decision block 504 a determination is made as to whether $F(p)=f\epsilon\ T_{freq}$, that is, if the $f$ has an entry in the $T_{freq}$ table.

When $F(p)=f\epsilon\ T_{freq}$, the compressor moves to block 506, where the compressor updates the updates the value $f$ count by one and computes the frequency. Moving to decision block 510, a determination is made as to whether the codes are up to date in the $T_{freq}$ table. When they are, the flow moves to block 512, at which point the compressor replaces $f$ with the corresponding value c in the $T_{freq}$ table and forwards the compressed packet. When the codes are not up to date, the flow moves to block 514 where the compressor replaces $f$ with the corresponding value c in the $T_{freq}$ table, forwards the compressed packet, and then updates the codes. The new rate $f$ rate is computed using time $t_p$ for all entries in the table and the codes c are reassigned based on the new frequencies $f$ freq.

Otherwise, when $F(p)=f\epsilon T_{freq}$, is not true, the compressor moves to decision block 508, where a determination is made if $f$ is in $T_{rec}$. When $f$ is in $T_{rec}$, that is, if the filter of p has an entry in the $T_{rec}$ table, then the compressor then the process moves to block 520, where compressor replaces $f$ with the corresponding value c in the $T_{rec}$ table and forwards the compressed packet, updates the value $f$ count is incremented by one, computes the new rate $f$ rate($f_1$) using time $t_p$ for all entries $f_j$ in the table $T_{freq}$ and compares it with $f$ rate($f$) at decision block 522. If there exists some value $f_j$ in $T_{freq}$ such that $f$ rate($f_j$)<$f$ rate($f$), then the process moves to block 518 to replace the entry corresponding to $f_j$ with the entry corresponding to $f$; remove the entry corresponding to $f$ in $T_{rec}$. Otherwise, the entry is added corresponding to $f$ as the last one in $T_{rec}$ and forward p as is.

Otherwise, if $T_{rec}$, is full, that is, if it contains $D_{rec}$ entries, then the process moves to block 516 to remove the first entry in the table $T_{rec}$ moves up all the entries so that the second becomes first, the third second, etc, adds the entry corresponding to $f$ last in $T_{rec}$, and forward p as is.

This defines both the compressor, and the decompressor, as it suffices to replace p with the compressed packet, and substitute c and $f$ in the table update process described above. For instance, if the received code c corresponds to an entry in $T_{freq}$, then replace c with its $f$ to recover and forward the initial packet p, then update the frequencies, and compute the new codes.

The assumption that the link is perfect ensures that both the compressor C and the decompressor D are synchronous, and that each side's copies of the $T_{freq}$ and the $T_{rec}$ are the same. In an actual real-world implementation, some mechanisms should be provided to ensure both C and D share the same information. For example, C and D could send each other some checksum periodically for instance. The algorithm is robust to a few packets being dropped if they belong to a longer microflow or if they use some reliable internet protocol.

A.3 Context Transfer

So far, the compression algorithm as it attaches to a given link has been described. However, since $T_{freq}$ and $T_{rec}$, depend on user u and the user u could be mobile. Consider for instance u to be a mobile node (MN) in an IPv6 network.

Below are the steps used to ensure that the access router (AR) to which u attaches has the compression information available:

When the MN attaches to a new domain after a dormant period, the AR requests the data $T_{freq}$ and $T_{rec}$ from its Home Agent.

When the MN transfers from one AR to the next, a context transfer protocol is used to transfer the tables $T_{freq}$ and $T_{rec}$. from the old AR to the new AR.

When the MN leaves an AR with no next muter to transfer the context to, then the last AR transfers the table $T_{freq}$ and $T_{rec.}$ back to the HA.

B. Evaluation

In this section, the performance of the compression algorithm described is evaluated over the model and the data set that that was used in another section.

B.1 Evaluation Procedure

According to one embodiment of the invention, the algorithm described is implemented in the following way: for each set of data, the two tables $T_{freq}$ and $T_{rec}$ were computed as the data was being processed.

However, instead of frequency, a simple packet count was used. This simplification comes with no loss of generality, as the time of first occurrences for the different filters are close to each other with respect to the overall length of the trace. Same with the Zipf model, where the packets filters are generated independently, and are represented homogeneously over the generated trace. If anything, this simplification diminishes the performance of the compression algorithm.

The filter used is only the destination address, and not the whole IP 5-tuple. Note that for user u the source address is always the same, and there is less variance in the protocol number (usually 80% TCP, 15% UDP and few others). This implies that the performance gain would be more significant using the whole IP-tuple as filter instead of its most variable field.

The code used in the evaluation is very simple: one bit is used to point to either one of $T_{freq}$ or $T_{rec}$. $T_{freq}$ entries are ordered from most frequent to less frequent, and $T_{rec}$ entries are ordered from less recent to most recent. The code assigned is then the rank in the table the filter belongs to. For instance, the third most frequent filter in $T_{freq}$ is coded in 1 bit to point at $T_{freq}$ and 2 bits to code 3, thus 3 bits.

The performance measure of the compression algorithm computed is the average code length. Entries that do not belong to any of the tables are accounted for their full size, namely 32 bits. The simulation started with both tables empty.

B.2 Results

The results are now presented. The algorithm was run on two sets of data: one is a selection of nodes that we extracted from the LBL-CONN-7 trace. Twenty three (23) nodes were randomly picked among those with at least 500 outgoing connections. These nodes average connections with 699 different correspondent nodes. The second set of data is an artificial trace obtained by generating random values with a Zipf distribution over an alphabet of 700 correspondent nodes. The compression ratio was computed, that is the achieved average code length divided by the actual size of the uncompressed header.

Figure 6:
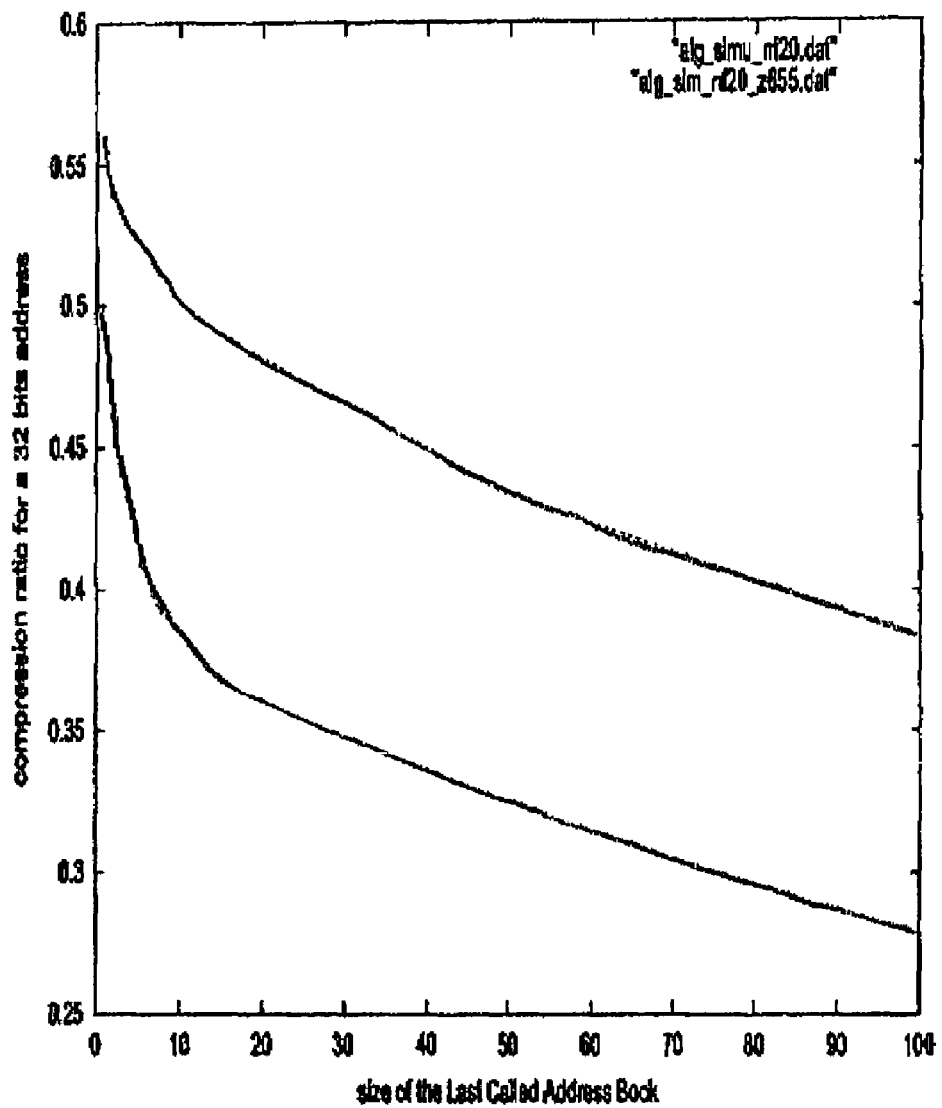
FIG. 6 shows an exemplary graph of achieved compression for $N_{mfab}=20$.
Figure 7:
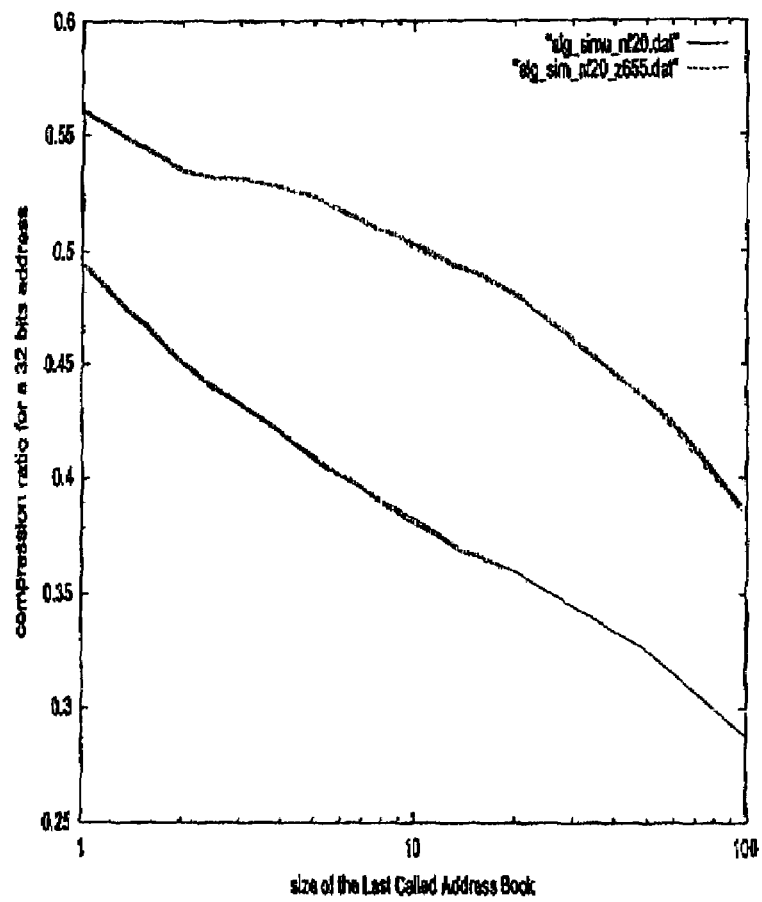
FIG. 7 illustrates an exemplary log diagram for the achieved compression with $N_{mfab}=20$.

The values of two parameters were varied: the maximum sizes $D_{freq}$ and $D_{rec}$. In FIG. 6, $D_{freq}$ was set to the value of 20 and vary $D_{rec}$ between 1 and 100. In a FIGURE, the same graph is plotted with a logarithmic scale for the x-axis. It can be seen that for both the LBL-CONN-7 trace and the Zipf generated trace, a straight line is obtained.

The LBL-CONN-7 is consistently higher than our trace, even though the number of different outgoing connection for a single user is the same on average in both traces. One possible explanation is the dependencies between consecutive calls in the LBL-CONN-7 trace. The calls are independent in the Zipf generated traces, whereas they are correlated in the LBL-CONN-7 trace, and this would induce more calls to the LCAB table.

Figure 8:
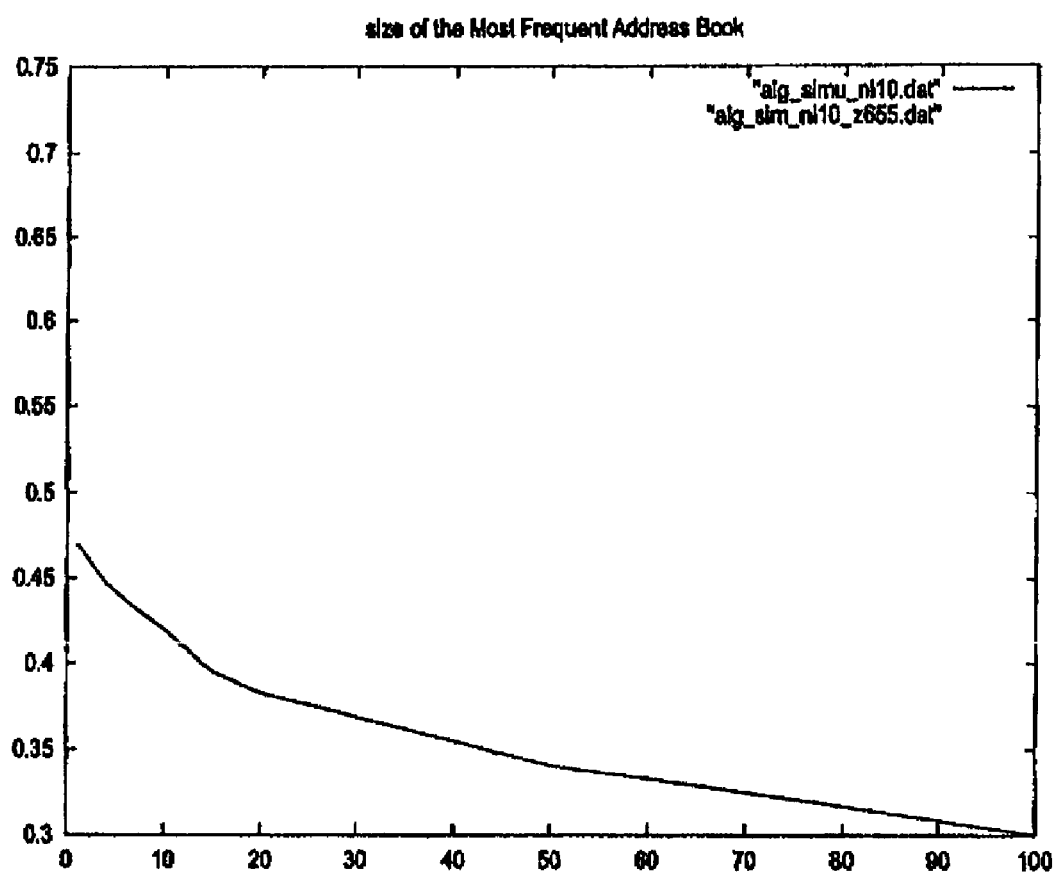
FIG. 8 shows an exemplary graph of achieved compression for $N_{lcab}=10$.
Figure 9:
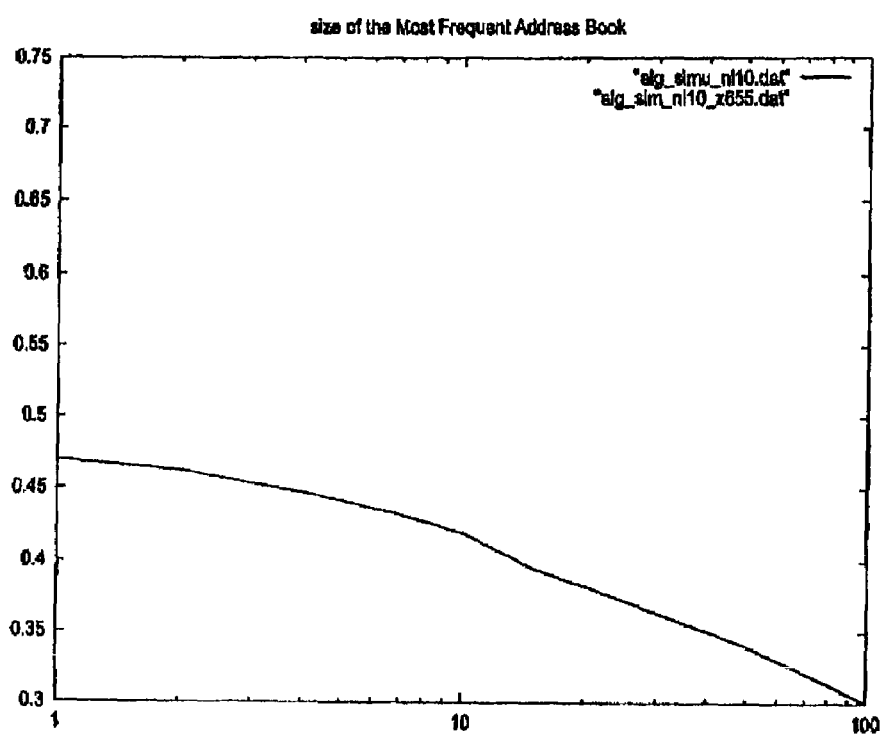
FIG. 9 illustrates an exemplary log diagram for the achieved compression with $N_{lcab}=10$.

In FIG. 8, $D_{rec}$ is set to 10 and vary $D_{freq}$. Once again, the Zipf model gives a conservative estimate. As the previous case, it can be seen that the compression ratios improves as $D_{freq}$ increases. In the log diagram 9, it is again seen again that the Zipf generated trace produces a linear improvement with slope −1. The actual LBL-CONK-7 trace seems to converge to a linear asymptote with slope −1.

In both FIGS. 6 and 8, it can be seen that an achieved compression ratio of two thirds is easily attainable with for instance $D_{freq}=20$, $D_{rec}=60$ or with $D_{freq}=60$, $D_{rec}=10$. A compression ratio of 40% is attainable with less than 30 total entries in both tables. The improvement was computed solely on the destination address, and not on the full IP 5-tuple. The larger the header, the better the improvement, since the ratio $r_{FHC}$ is computed as:

$$r_{FHC} \sim \frac{P[hit]\ \text{code length} + P[miss]\text{header size}}{\text{header size}} \quad \text{(EQUATION 11)}$$

$$= P[hit]\frac{\text{code length}}{\text{header size}} + P[miss] \quad \text{(EQUATION 12)}$$

where P[hit] and P[miss] are the probability to hit or miss the filter tables.

VI. Conclusion

A scheme to improve on the bandwidth utilization of the wireless link is shown. A Header Space Compression Engine, which works in complement of the traditional Van Jacobson, ROHC header compression was shown.

It was shown that the size of the headers using a table with 30 entries can easily be reduced by almost ⅔. It was shown that actual data has the same behavior than a model that we identified, and which gives an upper bound. 32 bits IPv4 headers were used, but the improvement would be of course more significant with 128 headers, both in terms of compression ratio and in terms of saved bandwidth.

To achieve a 50% improvement on the header size would mean—if the mobile device at the end of the compressed link received the same traffic patterns as a generic node in today's internet—an improvement of 20 bytes per packet. Since the mean packet size is 400 bytes, the saved bandwidth would represent 20/400=5% of the total Internet traffic. The bandwidth saved by Header Compression would be at most 40 bytes per header for the UDP share of the traffic, namely 15%. Thus, the improvement of ROHC is at most: 1−(400*0.85+360*0.15)/400=1.5% of the total internet traffic.

An algorithm that can compress headers and may potentially save three times as much bandwidth as the existing header compression schemes if the end terminal was one of today's wired end user was shown.

VII. Entropy of Zipf's Distribution

In this section, the steps are given to one of many ways to compute the entropy of Zipf's distribution, using the notations of section IV-B.2, recalling that $\Omega \sim (\ln(N))^{-1}$, and omitting negligible terms whenever possible. The third step is possible due to the decreasing monotonicity of $$\frac{\log(x)}{x}$$

over the interval $\left(\frac{1}{\Omega}, \frac{N}{\Omega}\right)$:

$$H^z = \sum_{i=1}^{N} \frac{\Omega}{i}(\log(i) - \log(\Omega)) \quad \text{(EQUATION 13)}$$

$$= \sum_{i=1}^{N} \frac{\log\left(\frac{i}{\Omega}\right)}{\frac{i}{\Omega}}$$

$$\sim \int^{N} \frac{\log\left(\frac{u}{\Omega}\right)}{\frac{u}{\Omega}} du$$

$$\sim \int_{\frac{1}{\Omega}}^{\frac{N}{\Omega}} \frac{\log(s)}{s} ds$$

$$\sim \frac{\Omega}{\ln(2)} \left[ \frac{(\ln(s))^2}{2} \right]_{\frac{1}{\Omega}}^{\frac{N}{\Omega}}$$

$$\sim \frac{\Omega}{2\ln(2)} \left[ \ln \frac{N}{\Omega} \right]^2$$

$$\sim \frac{1}{2} \log N$$

Figure 10:
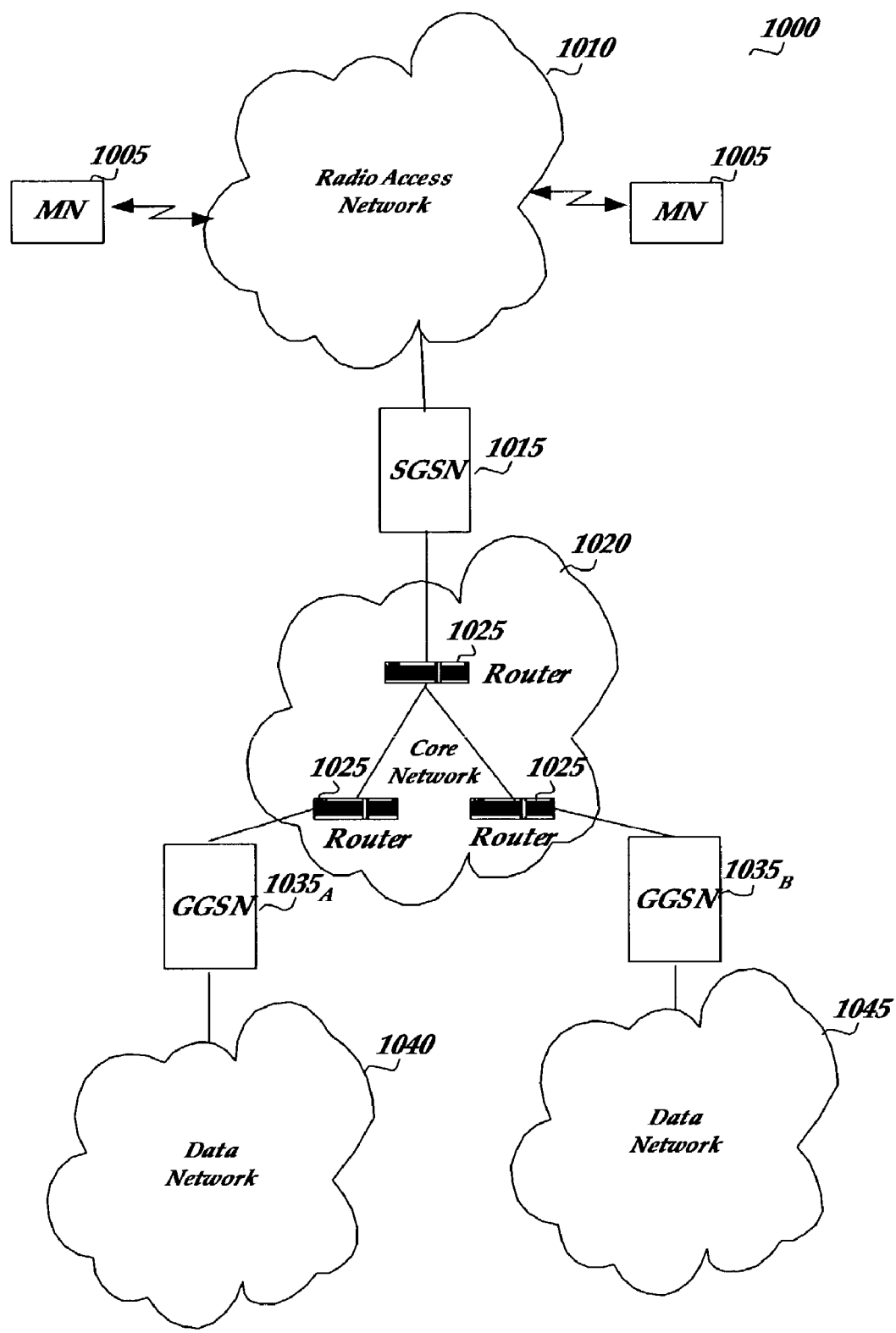
FIG. 10 illustrates an exemplary cellular network coupled with data networks in which the invention may operate.

With reference to FIG. 10, an exemplary cellular network coupled with data networks, in which the invention may operate is illustrated. As shown in the figure, network 1000 includes mobile nodes (MN) 1005, radio access network (RAN) 1010, SGSN 1015, core network 1020, routers 1025, GGSNs 1035$_{A-B}$, data network 1040, and data network 1045.

The connections and operation for network 1000 will now be described. MN 1005 is coupled to radio access network (RAN) 1010. Generally, MN 1005 may include any device capable of connecting to a wireless network such as radio access network 110. Such devices include cellular telephones, smart phones, pagers, radio frequency (RF) devices, infrared (IR) devices, integrated devices combining one or more of the preceding devices, and the like. MN 105 may also include other devices that have a wireless interface such as Personal Digital Assistants (PDAs), handheld computers, personal computers, multiprocessor systems, microprocessor-based or programmable consumer electronics, network PCs, wearable computers, and the like.

Radio Access Network (RAN) 1010 manages the radio resources and provides the user with a mechanism to access core network 1020. Radio access network 1010 transports information to and from devices capable of wireless communication, such as MN 1005. Radio access network 1010 may include both wireless and wired components. For example, radio access network 1010 may include a cellular tower that is linked to a wired network. Typically, the cellular tower carries communication to and from cell phones, pagers, and other wireless devices, and the wired network carries communication to regular phones, long-distance communication links, and the like.

Some nodes may be General Packet Radio Service (GPRS) nodes. For example, Serving GPRS Support Node (SGSN) 1015 may send and receive data from mobile nodes, such as MN 1005, over RAN 1010. SGSN 1015 also maintains location information relating to MON 105. SGSN 1015 communicates between MN 1005 and Gateway GPRS Support Node (GGSN)s 1035$_{A-B}$ through core network 1020.

Core network 1020 may be an IP packet based backbone network that includes routers, such as routers 1025, to connect the nodes in the network. Routers are intermediary devices on a communications network that expedite message delivery. On a single network linking many computers through a mesh of possible connections, a router receives transmitted messages and forwards them to their correct destinations over available routes. Routers may be a simple computing device or a complex computing device. For example, a router may be a computer including memory, processors, and network interface units.

GGSNs 1035$_{A-B}$ are coupled to core network 1020 through routers 1025 and act as wireless gateways to data networks, such as network 1040 and network 1045. Networks 1040 and 1045 may be the public Internet or a private data network. GGSNs 1035$_{A-B}$ allow MN 1005 to access network 1040 and network 1045.

Furthermore, computers, and other related electronic devices may be connected to network 1040 and network 1045. The public Internet itself may be formed from a vast number of such interconnected networks, computers, and routers. Mobile network 1000 may include many more components than those shown in FIG. 10. However, the components shown are sufficient to disclose an illustrative embodiment for practicing the present invention.

The media used to transmit information in the communication links as described above illustrate one type of computer-readable media, namely communication media. Generally, computer-readable media includes any media that can be accessed by a computing device. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Figure 11:
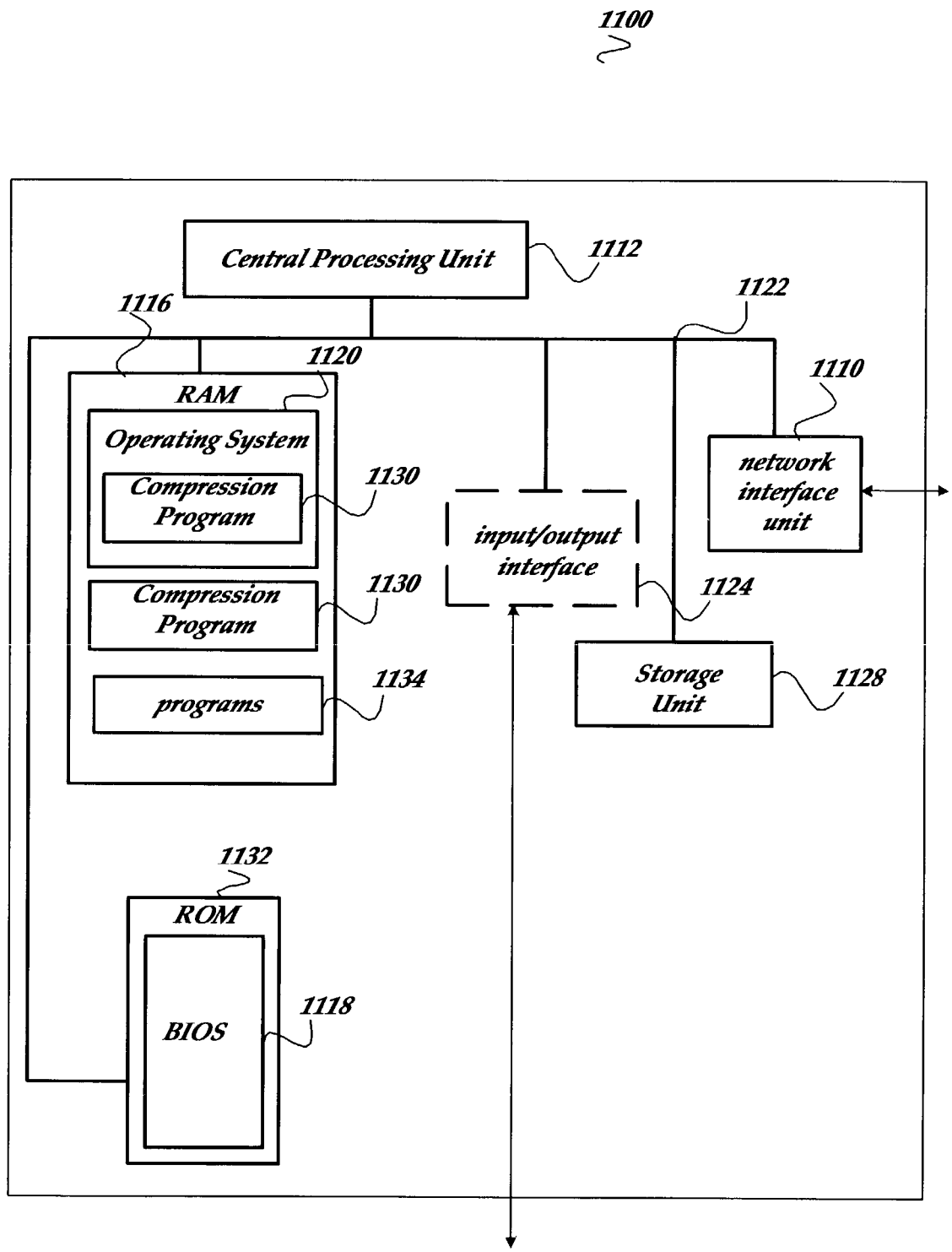
FIG. 11 is a schematic diagram that shows an exemplary compression device that is operative to compress headers, in accordance with aspects of the invention.

FIG. 11 is a schematic diagram that shows an exemplary compression device that is operative to compress headers. Accordingly, device 1100 may compress headers.

Device 1100 may include many more components than those shown in FIG. 11. However, the components shown are sufficient to disclose an illustrative embodiment for practicing the present invention. As shown in FIG. 11, device 1100 is coupled to a network, via network interface unit 1110. Network interface unit 1110 includes the necessary circuitry for connecting device 1100 to a network, and is constructed for use with various communication protocols including the Transmission Control Protocol (TCP). Other communications protocols may be used, including, for example, User Datagram Protocols (UDP). Typically, network interface unit 1110 is a card contained within device 1100.

Device 1100 also includes processing unit 1112, and a mass memory, all connected via bus 1122. The mass memory generally includes RAM 1116, ROM 1132, and includes one or more permanent mass storage devices, such as storage unit 1128. Storage unit 1128 is used to store microflow information. More specifically, storage unit 1128 is used to store most frequent microflows and most recent microflows. The mass memory stores operating system 1120 for controlling the operation of device 1100. This component may comprise a general purpose server operating system 1120 as is known to those of ordinary skill in the art, such as UNIX, LINUX™, or Microsoft WINDOWS NT®. Basic input/output system ("BIOS") 1118 is also provided for controlling the low-level operation of device 1100.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data for compression program 1130 (See Figures and Related discussion above), and programs 1134. Compression program 1130 includes computer executable instructions which, when executed by device 1100, apply a compression scheme to packets. Compression program 1130 may be kernel based, or non-kernel based. Additionally, some parts of compression program 1130 may be implemented in the kernel, while other parts are implemented outside of the kernel. Device 1100 may also comprise an input/output interface 1124 for communicating with external devices, such as a keyboard, display, or other input/output device not shown in FIG. 11.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for header compression, comprising:
   determining when a packet arrives;
   keeping track of microflow information for a filter relating to the packet;
   selecting one of a plurality of codes based on the tracked microflow information; and
   compressing the filter with the selected code.

2. The method of claim 1, wherein keeping track of the microflow information for the filter relating to the packet, further comprises keeping track of the most frequent microflows and the most recent microflows.

3. The method of claim 2, further comprising comparing the filter to the most frequent microflows.

4. The method of claim 3, further comprising comparing the filter relating to the packet to the most recent microflows.

5. The method of claim 4, wherein keeping track of the most frequent microflows and the most recent microflows further comprises storing the most frequent microflows and the most recent microflows.

6. The method of claim 5, wherein storing the most frequent microflows and the most recent microflows further comprises storing a compression function and a decompression function for the filter relating to the code.

7. The method of claim 4, wherein storing the most frequent microflows further comprises storing them in a first-in-first out manner.

8. The method of claim 7, wherein a table relating to the most frequent microflows and a table relating to the most recent microflows assign a mapping from the filter to a compression function.

9. The method of claim 3, wherein comparing the filter relating to the packet to the most frequent microflows further comprises determining if the codes relating to the most frequent microflows are up to date, and if yes, then compressing the filter with the code and sending the packet, otherwise, compressing the filter with the code, sending the packet, and updating the codes.

10. The method of claim 4, wherein comparing the filter relating to the packet to the most recent microflows further comprises computing a new rate for entries relating to the most recent microflows.

11. An apparatus for header compression, comprising:
    an interface unit arranged to communicate with a network;
    a storage unit arranged to store microflow information in first and second filter tables, wherein each of the first and second filter tables comprises different codes, and wherein the codes in the first filter table are shorter than codes in the second filter table; and
    a compressor that is arranged to perform the following actions, including:
      storing the microflow information in the storage unit; and
      determining if a filter has an entry in one of the first and second filter tables, and if yes then:
        replacing the filter with a code from the corresponding filter table; and updating the microflow information.

12. The apparatus of claim 11, wherein storing the microflow information in the storage unit further comprises storing the most frequent microflows in the first filter table and storing the most recent microflows in the second filter table.

13. The apparatus of claim 12, wherein determining if the filter has an entry in one of the first and second filter tables further comprises comparing the filter to the most frequent microflows.

14. The apparatus of claim 13, wherein determining if the filter has an entry in one of the first and second filter tables further comprises comparing the filter relating to the packet to the most recent microflows.

15. The apparatus of claim 14, wherein the storage relating to the microflow information assigns a mapping from the filter to a compression function.

16. A system for header compression, comprising:
    nodes arranged to communicate with a network; wherein the nodes include:
    a network interface unit configured to send and receive packets from the nodes;
    a storage unit arranged to store microflow information in first and second filter tables, wherein each of the first and second filter tables comprises different codes, and wherein the codes in the first filter table are shorter than codes in the second filter table; and
    a compressor that is arranged to perform the following actions, including:
      storing the microflow information in the storage unit; and
      determining if a filter has an entry in one of the first and second filter tables, and if yes then:
        replacing the filter with a code from the corresponding filter table; and updating the microflow information.

17. The system of claim 16, wherein storing the microflow information in the storage unit further comprises storing the most frequent microflows in the first filter table and storing the most recent microflows in the second filter table.

18. The system of claim 17, wherein determining if the filter has an entry in one of the first and second filter tables further comprises comparing the filter to the most frequent microflows.

19. The system of claim 18, wherein determining if the filter has an entry in one of the first and second filter tables further comprises comparing the filter relating to the packet to the most recent microflows.

20. The system of claim 19, wherein the storage relating to the microflow information assigns a mapping from the filter to a compression function.

21. The method of claim 1, wherein the selecting comprises:

determining if the filter has an entry in one of a first filter table and a second filter tables, wherein each of the first and second filter tables comprises different codes matched with filters, and wherein the codes in the first filter table are shorter than codes in the second filter table, and if yes then:

selecting a matching code from the corresponding filter table.

* * * * *